US011934877B2

(12) United States Patent
Nakfour

(10) Patent No.: US 11,934,877 B2
(45) Date of Patent: *Mar. 19, 2024

(54) WORKFLOW RESOURCE MANAGEMENT FOR CLOUD COMPUTING SERVICES

(71) Applicant: Red Hat, Inc., Raleigh, NC (US)

(72) Inventor: Juana Nakfour, Hawthorn Woods, IL (US)

(73) Assignee: Red Hat, Inc., Raleigh, NC (US)

(*) Notice: Subject to any disclaimer, the term of this patent is extended or adjusted under 35 U.S.C. 154(b) by 59 days.

This patent is subject to a terminal disclaimer.

(21) Appl. No.: 17/444,737

(22) Filed: Aug. 9, 2021

(65) Prior Publication Data
US 2021/0373958 A1 Dec. 2, 2021

Related U.S. Application Data

(63) Continuation of application No. 16/553,682, filed on Aug. 28, 2019, now Pat. No. 11,086,681.

(51) Int. Cl.
*G06F 9/50* (2006.01)
*G06F 9/30* (2018.01)

(52) U.S. Cl.
CPC ........ *G06F 9/5016* (2013.01); *G06F 9/30007* (2013.01); *G06F 9/5027* (2013.01); *G06F 9/5072* (2013.01)

(58) Field of Classification Search
CPC .................................................. G06F 9/5016
See application file for complete search history.

(56) References Cited

U.S. PATENT DOCUMENTS

| 10,031,774 | B2  |   | 7/2018  | Chen                    |
|------------|-----|---|---------|-------------------------|
| 2002/0112054 | A1 | * | 8/2002  | Hatanaka ........ H04L 9/40 |
|            |     |   |         | 709/225                 |
| 2011/0137983 | A1 |   | 6/2011  | Xu et al.               |
| 2011/0225312 | A1 |   | 9/2011  | Liu et al.              |
| 2016/0358103 | A1 |   | 12/2016 | Bowers et al.           |
| 2019/0087232 | A1 |   | 3/2019  | Bergsma et al.          |
| 2021/0004273 | A1 | * | 1/2021  | You .............. G06F 9/5027 |

OTHER PUBLICATIONS

Trouillaud, A. "Running Argo Workflows Across Multiple Kubernetes Clusters", Admiralty Technologies, Inc. Jan. 17, 2019, updated Mar. 17, 2019, https://admiralty.io/blog/running-argo-workflows-across-multiple-kubernetes-cluster, downloaded Jun. 3, 2019, 6 pages.

* cited by examiner

*Primary Examiner* — Charlie Sun
(74) *Attorney, Agent, or Firm* — Womble Bond Dickinson (US) LLP

(57) ABSTRACT

A workflow resource manager receives a request to execute a workflow in a cloud computing environment. The workflow resource manager determines that a first set of cloud computing resource requirements associated with the first set of operations for the workflow is satisfied by available cloud computing resources, and responsive to determining that a second set of cloud computing resource requirements associated with a subsequent set of operations for the workflow is not satisfied by the available cloud computing resources, rejects the request to execute the workflow.

19 Claims, 7 Drawing Sheets

WORKFLOW RESOURCE MANAGEMENT FOR CLOUD COMPUTING SERVICES

RELATED APPLICATIONS

This application is a continuation of U.S. patent application Ser. No. 16/553,682, filed Aug. 28, 2019, to be issued on Aug. 10, 2021 as U.S. Pat. No. 11,086,681, the entirety of which is incorporated herein by reference.

TECHNICAL FIELD

The present disclosure is generally related to computer systems, and more particularly, to workflow resource management for cloud computing systems.

BACKGROUND

Platform-as-a-Service (PaaS) system offerings can include software and/or hardware facilities for facilitating the execution of applications (web applications, mobile applications, etc.) in a cloud computing environment (the "cloud"). Cloud computing is a computing paradigm in which a user engages a "cloud provider" to execute a program on computer hardware owned and/or controlled by the cloud provider. A cloud provider can make virtual machines (VMs) hosted on its computer hardware available to customers for this purpose. The cloud provider can provide an interface that a user can use to requisition virtual machines and associated resources such as security policies, processors, storage, and network services, etc., as well as an interface to install and execute the user's applications and files on the virtual machines.

PaaS offerings can facilitate deployment of web applications without the cost and complexity of buying and managing the underlying hardware and software and provisioning hosting capabilities, providing the facilities to support the complete life cycle of building and delivering web applications and services entirely available from the Internet.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
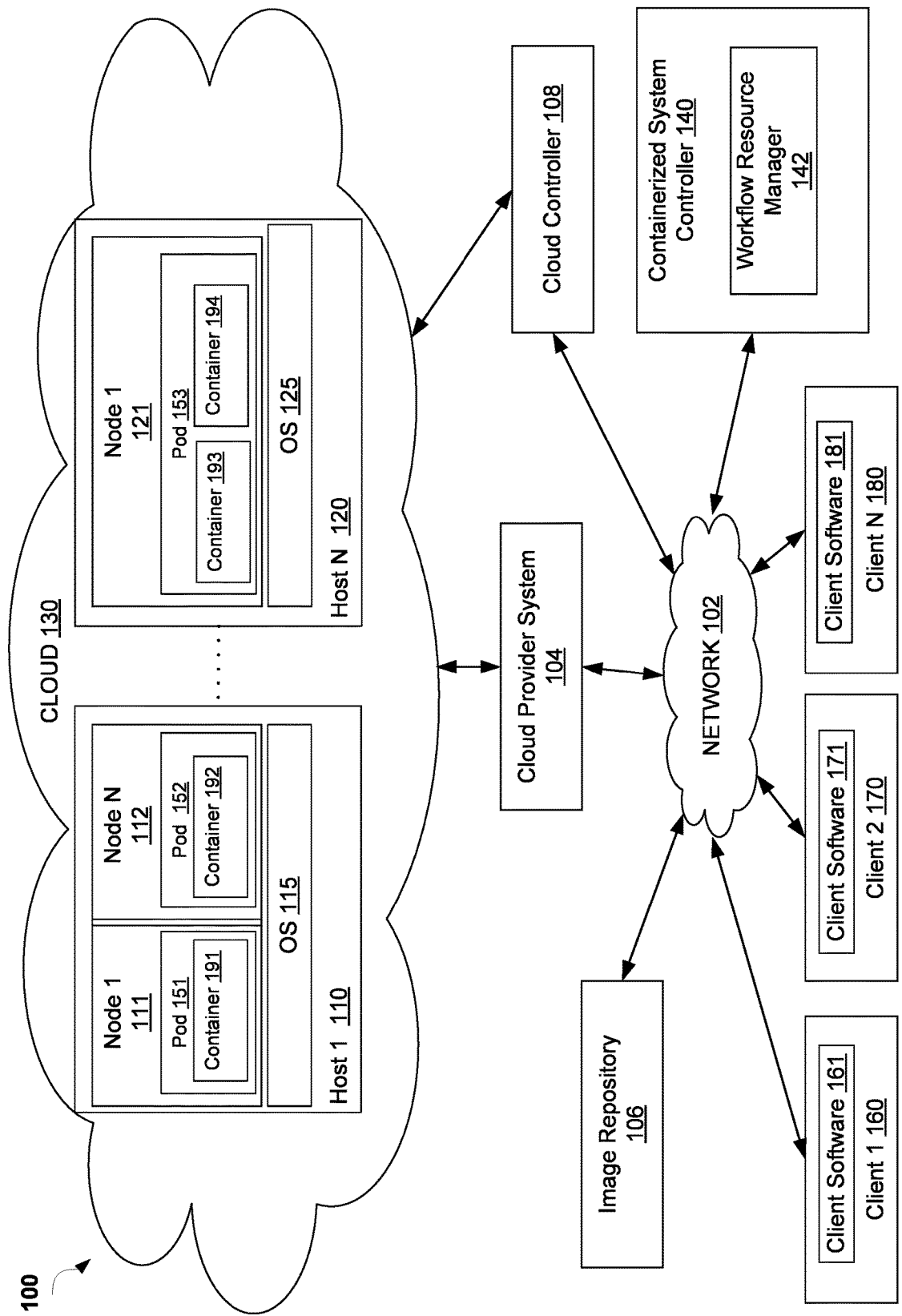
FIG. 1 depicts a high-level component diagram of an example computer system architecture, in accordance with one or more aspects of the present disclosure.

Described herein are methods and systems for workflow resource management for cloud computing systems in a cloud computing environment. Cloud computing environments provide many advantages over locally owned computing systems. For example, cloud computing environments can optimize resources by sharing them across multiple users and multiple clients, thereby reducing costs otherwise dedicated to procuring and maintaining local hardware. Additionally, cloud computing environments provide improved scalability for clients. Instead of purchasing additional local computing resources, supporting more data storage and buying more software licenses to support growth in the business, users can rent more storage space, acquire more bandwidth and increase access to software programs which are controlled by a cloud computing provider.

Cloud computing environments, however, can present challenges to developers and administrators who maintain applications that are resource intensive. Cloud computing network clusters can have limited resources such as processors, memory, and disk space. These limited resources can be costly when implementing an application and can dramatically increase the cost of maintaining a cluster when demands for these types of resources increases. A major problem encountered by developers and administrators when implementing these types of systems involves provisioning the available resources effectively. Too many free resources can increase costs and possible result in increased idle time, while too few resources can cause decrease performance and efficiency of the applications in the environment. This can be particularly problematic with artificial intelligence (AI) and machine learning (ML) workloads that are resource intensive.

Some conventional cloud computing environments manage automatic execution of resource intensive systems by implementing workflows. A workflow is a set of logical components that are linked together by defined dependencies between each step of a process. In many conventional systems, an AI/ML workflow can be represented by a directed a cyclic graph (DAG) that includes multiple layers, where each layer can include sets of operations. For a workflow to execute successfully on a cluster, the necessary resources required for each part of the workflow should be available when that layer of the workflow executes. In conventional cloud computing systems, the operations of a layer in a workflow can be executed in a collection of containers, sometimes referred to as a pod. These types of implementations can provide the ability define resource requirements for each layer such that a pod created for that layer should have the appropriate resources to complete its execution. System administrators can set constraints to limit the number of objects or the amount of cloud computing resources that are used by a workflow implementation, which can improve overall resource management within an environment. These types of solutions, however, can often result in workflow failures since they typically manage workflow resources one layer at a time. Thus, while resources may be available within an environment to execute the first layer of a workflow, the resource may not be available to execute a subsequent layer. Should this situation occur, the workflow can fail during the execution of the subsequent layer (e.g., after one or more layers have already executed, but before the entire workflow has completed), and the entire workflow may fail to complete successfully. This can result in significant increases in costs and reduction in system efficiency since several layers of a workflow may have been executed with unnecessary computation and resource usage.

Aspects of the present disclosure address the above noted and other deficiencies by implementing a workflow resource manager (e.g., as a computer program or a computer program component) to facilitate workflow resource management for cloud computing services of a cloud computing environment. The workflow resource manager can receive a request to execute a workflow, and prior to executing the workflow, analyzing each layer (as well as each layer's dependencies within the workflow) to assess the resource requirements and whether or not there are cloud computing resources available to satisfy the requirements of every level of the workflow. If there are sufficient resources to execute each layer, the workflow can be executed. Otherwise, the request can be rejected. Additionally, the workflow resource manager can pre-provision cloud computing resources for an executing workflow. While one layer is executing, the workflow resource manager can identify and reserve resources for the next layer of the workflow (as well as any resources to satisfy any dependencies between the layers) in preparation for its execution.

Aspects of the present disclosure present advantages over conventional solutions to the issues noted above. First, the workflow resource manager of the present disclosure provides the ability to assess the resource needs of an entire workflow prior to its execution. This can significantly improve the efficiency of an executing workflow, reducing the likelihood of failure. Thus, the negative consequences of a failed workflow, such as increased costs due to additional workflow executions, can be dramatically reduced. Additionally, the workflow resource manager of the present disclosure can pre-provision resources during execution. This can result in a subsequent layer of a workflow being initiated more quickly, thereby reducing the overall execution time of the workflow and potential idle time of unused resources. Thus, the resource management of the entire cloud computing system can be dramatically improved. Moreover, by analyzing the structure of workflows preemptively, the workflow resource manager can orchestrate between multiple executing workflows within the cloud computing environment, providing increased efficiency in management of cloud computing resources.

FIG. 1 is a block diagram of a network architecture 100 in which implementations of the disclosure may operate. In some implementations, the network architecture 100 may be used in a containerized computing services platform. A containerized computing services platform may include a Platform-as-a-Service (PaaS) system, such as OpenShift® or Kubernetes®. The PaaS system provides resources and services (e.g., micro-services) for the development and execution of applications owned or managed by multiple users. A PaaS system provides a platform and environment that allow users to build applications and services in a clustered compute environment (the "cloud") Although implementations of the disclosure are described in accordance with a certain type of system, this should not be considered as limiting the scope or usefulness of the features of the disclosure. For example, the features and techniques described herein can be used with other types of multi-tenant systems and/or containerized computing services platforms.

As shown in FIG. 1, the network architecture 100 includes a cloud-computing environment 130 (also referred to herein as a cloud) that includes nodes 111, 112, 121 to execute applications and/or processes associated with the applications. A "node" providing computing functionality may provide the execution environment for an application of the PaaS system. In some implementations, the "node" may refer to a virtual machine (VM) that is hosted on a physical machine, such as host 1 110 through host N 120, implemented as part of the cloud 130. For example, nodes 111 and 112 are hosted on physical machine of host 1 110 in cloud 130 provided by cloud provider 104. In some implementations, an environment other than a VM may be used to execute functionality of the PaaS applications. When nodes 111, 112, 121 are implemented as VMs, they may be executed by operating systems (OSs) 115, 125 on each host machine 110, 120.

In some implementations, the host machines 110, 120 are often located in a data center. Users can interact with applications executing on the cloud-based nodes 111, 112, 121 using client computer systems, such as clients 160, 170 and 180, via corresponding client software 161, 171 and 181. Client software 161, 171, 181 may include an application such as a web browser. In other implementations, the applications may be hosted directly on hosts 1 through N 110, 120 without the use of VMs (e.g., a "bare metal" implementation), and in such an implementation, the hosts themselves are referred to as "nodes".

Clients 160, 170, and 180 are connected to hosts 110, 120 in cloud 130 and the cloud provider system 104 via a network 102, which may be a private network (e.g., a local area network (LAN), a wide area network (WAN), intranet, or other similar private networks) or a public network (e.g., the Internet). Each client 160, 170, 180 may be a mobile device, a PDA, a laptop, a desktop computer, a tablet computing device, a server device, or any other computing device. Each host 110, 120 may be a server computer system, a desktop computer or any other computing device. The cloud provider system 104 may include one or more machines such as server computers, desktop computers, etc.

In various implementations, developers, owners, and/or system administrators of the applications may maintain applications executing in cloud 130 by providing software development services, system administration services, or other related types of configuration services for associated nodes in cloud 130. This can be accomplished by accessing cloud 130 using an application programmer interface (API) within the applicable cloud service provider system 104. In some implementations, a developer, owner, or system administrator may access the cloud service provider system 104 from a client device (e.g., clients 160, 170, and 180) that includes dedicated software to interact with various cloud components. Additionally, or alternatively, the cloud service provider system 104 may be accessed using a web-based or cloud-based application that executes on a separate computing device that communicates with a client device via network 102.

In one implementation, the cloud provider system 104 is coupled to a cloud controller 108 via the network 102. The cloud controller 108 may reside on one or more machines (e.g., server computers, desktop computers, etc.) and may manage the execution of applications in the cloud 130. In some implementations, cloud controller 108 receives commands from containerized system controller 140. In view of these commands, the cloud controller 108 provides data (e.g., such as pre-generated images) associated with different applications to the cloud provider system 104. In some implementations, the data may be provided to the cloud provider 104 and stored in an image repository 106, in an image repository (not shown) located on each host 110, 120, or in an image repository (not shown) located on each node 111, 112, 121. This data may be used for the execution of applications for a containerized computing services platform managed by the containerized system controller 140.

In one implementation, the data is used for execution of containers 191, 192, 193, 194 in one or more pods 151, 152, 153. The pods 151, 152, 153 area group of one or more containers that are deployed together on the same node 111, 112, 121, and are the smallest compute unit that can be defined, deployed, and managed in the containerized computing service environment. Each pod 151, 152, 153 is allocated its own internal IP address, with containers 191, 192, 193, 194 within pods 151, 152, 153 being able to share local storage and networking. Pods 151, 152, 153 have a lifecycle that is defined and can run on a node 111, 112, 121 until the pod's containers exit or they are removed for some other reason.

The containers 191, 192, 193, 194 can include application images built from pre-existing application components and source code of users managing the application. An image may refer to data representing executables and files of the application used to deploy functionality for a runtime instance of the application. In one implementation, the image can be built using a Docker™ tool and is referred to as a Docker image. In other implementations, the application images can be built using other types of containerization technologies. An image build system (not pictured) can generate an application image for an application by combining a preexisting ready-to-run application image corresponding to core functional components of the application (e.g., a web framework, database, etc.) with source code specific to the application provided by the user. The resulting application image may be pushed to image repository 106 for subsequent use in launching instances of the application images for execution in the PaaS system.

In various implementations, a container 191, 192, 193, 194 can be a secure process space on the nodes 111, 112, 121 to execute functionality of an application. In some implementations, a container 191, 192, 193, 194 is established at the nodes 111, 112, 121 and 122 with access to certain resources of the underlying node, including memory and storage. In one implementation, the containers 191, 192, 193, 194 may be established using the Linux Containers (LXC) method. In further implementations, containers 191, 192, 193, 194 may also be established using cgroups, SELinux™, and kernel namespaces, to name a few examples.

In some implementations, the containerized system controller 140 may include a workflow resource manager 142 that implements workflow resource management for the cloud-based PaaS system described above. Workflow resource manager 142 can analyze a workflow prior to allowing its execution to determine whether the resources of cloud 130 are sufficient to satisfy the resource requirements of the entire workflow. Workflow resource manager 142 can receive a request to execute a workflow in cloud 130. In some implementations, the request may be received from one of clients 160, 170, 180. The workflow resource manager 142 can then analyze the workflow to determine whether it can be executed in view of the available resources within cloud 130. Workflow resource manager 142 can analyze the workflow layer by layer, comparing the resource requirements of each layer to the available resources within the cloud 130.

Workflow resource manager 142 can begin by determining the set of cloud computing resource requirements (e.g., processors (CPU), graphics processors (GPU), memory, disk space, bandwidth, etc.) associated with the operations that make up a layer of the workflow. Workflow resource manager 142 can subsequently determine whether the set of cloud computing resource requirements associated with the layer is satisfied by the available cloud computing resources within cloud 130. If the cloud computing resources of cloud 130 can satisfy the requirements of the layer, workflow resource manager 142 can proceed to the next layer of the workflow based on the workflow structure and workflow requirements (e.g., dependencies between layers, data passed between layers, etc.). If the cloud computing resources of cloud 130 are not sufficient to satisfy the requirements of the layer, workflow resource manager 142 can terminate the analysis without analyzing any additional layers of the workflow, and reject the request to execute the workflow.

Workflow resource manager 142 can also manage resource allocation for executing workflows. In such instances, while one layer of a workflow is being executed within cloud 130, workflow resource manager 142 can determine the resource requirements of the next layer of the workflow. Workflow resource manager 142 can then assess the cloud computing resources of cloud 130 and provision sufficient resources to satisfy the requirements of the next layer of the workflow. In some implementations, workflow resource manager 142 can reserve the resources for the next layer such that other processes or workflows are blocked from using them, thereby expediting the creation of any new pods and containers for the next layer of the workflow. When the executing layer of the workflow has completed, workflow resource manager 142 can execute the next layer of the workflow with the pre-provisioned cloud computing resources.

While aspects of the present disclosure describe the workflow resource manager 142 as implemented in a PaaS environment, it should be noted that in other implementations, the security profile manager can also be implemented in an Infrastructure-as-a-Service (Iaas) environment, such as such as Red Hat OpenStack®. Additionally, while for simplicity of illustration, FIG. 1 depicts a single cloud 130, aspects of the present disclosure can be implemented to manage workflows across multiple clouds 130. In such instances the workflow resource manager 142 can manage workflow resources for hybrid cloud environments, multi-cluster cloud environments, or the like. Workflow resource manager 142 is described in further detail below with respect to FIGS. 2-3.

Figure 2:
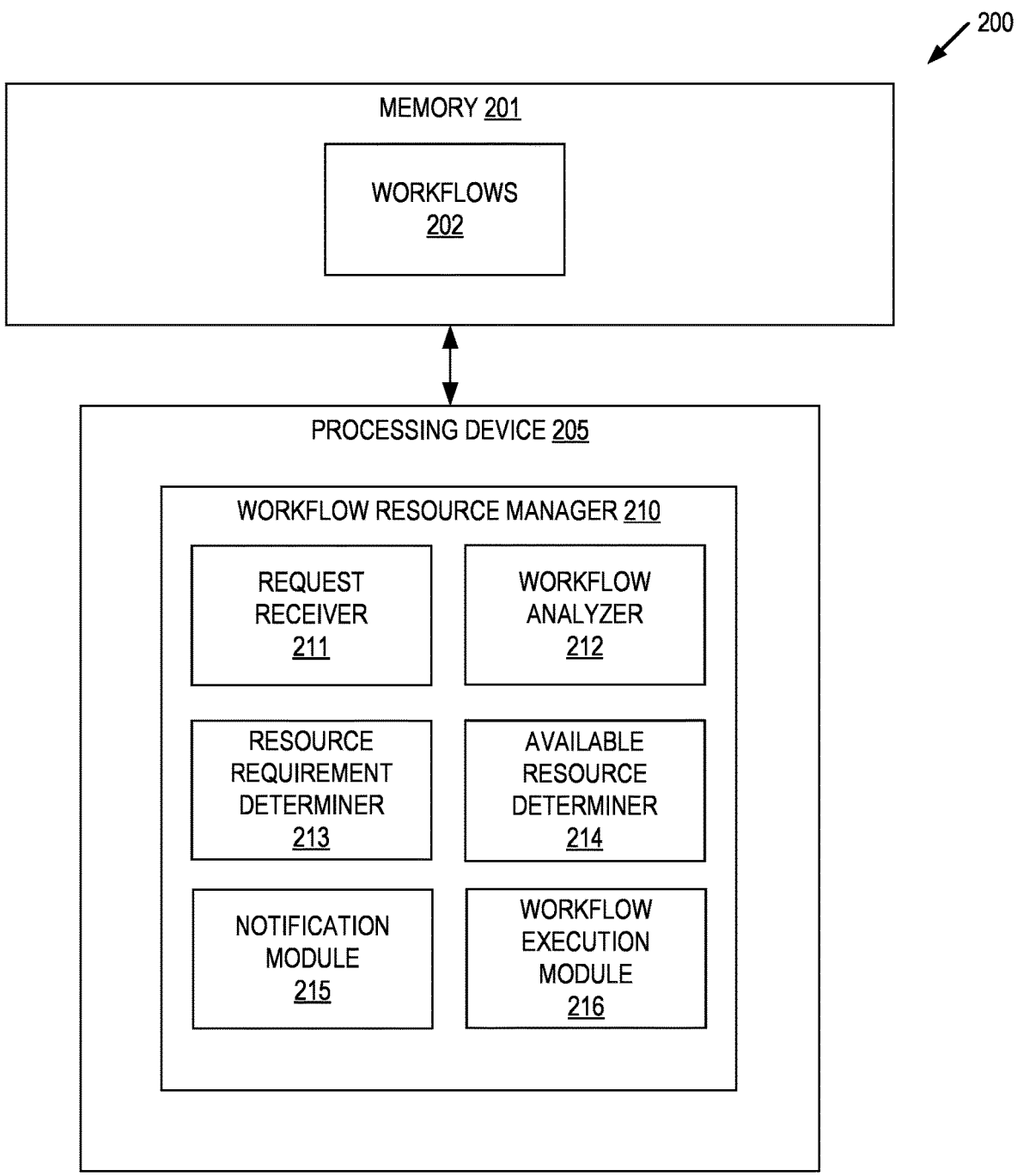
FIG. 2 depicts a block diagram illustrating an example of a workflow resource manager, in accordance with one or more aspects of the present disclosure.

FIG. 2 depicts a block diagram illustrating an example of a workflow resource manager 210 for facilitating workflow resource management for cloud computing services of a cloud computing environment. In some implementations, workflow resource manager 210 may correspond to workflow resource manager 142 of FIG. 1. As shown in FIG. 2, workflow resource manager 210 may be a component of a computing apparatus 200 that includes a processing device 205, operatively coupled to a memory 201, to execute workflow resource manager 210. In some implementations, processing device 205 and memory 201 may correspond to processing device 702 and main memory 704 respectively as described below with respect to FIG. 7.

Workflow resource manager 210 may include request receiver module 211, workflow analyzer 212, resource requirement determiner 213, available resource determiner 214, notification module 215, and workflow execution module 216. Alternatively, the functionality of one or more of request receiver module 211, workflow analyzer 212, resource requirement determiner 213, available resource determiner 214, notification module 215, and workflow execution module 216 may be combined into a single module or divided into multiple sub-modules.

Request receiver module 211 is responsible for receiving a request to execute a workflow in a cloud computing environment. As noted above, in some implementations, the cloud computing environment can be a containerized environment, where nodes can include pods, and where each pod can include one or more containers that can be used to execute applications within the environment. Cloud computing environments configured in such a manner can be an OpenShift based environment, a Kubernetes based environment, or the like. In some implementations, the cloud computing environment can be a hybrid cloud or multi-cluster cloud environment made up of multiple clouds of the same or different cloud providers (e.g., one cloud may be an OpenShift cloud, a second cloud could be a Kubernetes cloud, a third cloud could be an Amazon Web Services® (AWS) cloud, etc.).

In some implementations, the workflow may be a machine learning workflow, an artificial intelligence workflow, or other similar type of workflow used to implement resource intensive operations. In an illustrative example, the workflow may be a directed acyclic graph (DAG) that is made up of multiple components or layers, where each layer can include multiple sets of operations. In some implementations, one layer of a DAG can precede one or more additional layers (e.g., one set of operations can precede on or more additional sets of operations). In such instances the completion of a preceding layer can trigger the execution of a subsequent layer. Similarly, a subsequent layer can include data or resource dependencies that rely on the completion of a preceding layer or the data produced by a preceding layer. In various implementations, a layer of a workflow can be executed by one or more pods within the cloud computing environment. An example of a DAG workflow is described below with respect to FIG. 4.

In various implementations, request receiver module 211 can receive the request to execute the workflow from a client device (e.g., client devices 160, 170, 180 of FIG. 1). The request may be received from a developer or system administrator of the cloud computing environment to execute an application process. Alternatively, the request may be received from an end user accessing a cloud computing service provided by the environment. Responsive to receiving the request to execute the workflow, request receiver module 211 can invoke workflow analyzer 212. In some implementations, request receiver module 211 can receive the workflow and store it in a storage area (e.g., workflow 202). The workflow may be stored in memory, a storage device, or the like. Alternatively, request receiver module 211 can receive an identifier associated with a previously stored workflow, and retrieve the stored workflow from the storage area.

Workflow analyzer 212 is responsible for analyzing the received workflow to determine whether the cloud computing environment has sufficient available computing resources to execute the entire workflow. In various implementations, the cloud computing resources can include processor (CPU) resources, memory resources, communication port access resources, graphics processor (GPU) resources, tensor processing unit (TPU) resources, disk space, resources associated with persistent volume claims (PVC), bandwidth related resources, or the like. Workflow analyzer 212 can analyze the workflow layer by layer, starting with the root layer of the workflow. At each workflow layer, workflow analyzer 212 can invoke resource requirement determiner 213 to determine the resource requirements associated with that layer, and subsequently invoke available resource determiner 214 to determine whether sufficient resources can be provided to satisfy the requirements of that layer. If so, workflow analyzer 212 can repeat the process for subsequent layers of workflow until the entire workflow has been analyzed. If workflow analyzer 212 determines that there are insufficient system resources to satisfy any intermediate layer of the workflow, the request to execute the workflow may be rejected. In such instances, workflow analyzer 212 can terminate further analysis of subsequent layers of the workflow. For example, if a workflow analyzer 212 analyzes a workflow with three layers, and at layer 2 determines that there are insufficient resources to satisfy the resource requirements of layer 2, workflow analyzer 212 can reject the request to execute the workflow without proceeding to analyze the resource requirements of layer 3.

Resource requirement determiner 213 is responsible for determining the cloud computing resource requirements associated with a layer (e.g., the set of operations that make up the layer) of the workflow. As noted above, a workflow can include multiple layers, and each layer can include one or more components (e.g., one or more sets of operations) that are each directed to completing a particular task. In various implementations, resource requirement determiner 213 can analyze each component of a layer, determine the resource requirements of each component, and determine a total set of resource requirements for the components of that particular layer. For example, in a workflow that includes three components in a layer (e.g., reading data from a production environment, reading data from a development environment, and reading data from a local filesystem), resource requirement determiner 213 can determine the resource requirements for each of the three components, then calculate the total resource requirements for the entire layer, and subsequently invoke available resource determiner 214 to determine whether the cloud computing environment has available resources to satisfy the requirements of the entire layer. Alternatively, resource requirement determiner 213 can make separate resource requirement assessments for each component, and invoke available resource determiner 214 separately for each component of the layer.

In various implementations, resource requirement determiner 213 can determine resource requirements by analyzing the configuration of the workflow layer, analyzing the logic of the workflow layer (e.g., workflow dependencies, information passed between layers, etc.), or the like. For example, resource requirement determiner 213 can access configuration information associated with the workflow layer or included within the specification of the workflow layer that specifies the resource requirements for that layer. Alternatively, resource requirement determiner 213 can analyze the specification of the workflow layer to determine the resource requirements in view of the operations performed by the layer. For example, if the layer includes operations directed to reading data, requirement determiner 213 may determine that minimal CPU resources may be sufficient to perform the functionality of the layer. Similarly, if the layer includes operations directed to extensive mathematical calculation, requirement determiner 213 may determine that additional CPU resources may be necessary to perform the functionality of the layer.

In some implementations, resource requirement determiner 213 can also determine the resource requirements for a workflow layer in view of the dependencies between layers of the workflow. In some cases, a workflow can be configured with additional characteristics or logic that define information to be passed between layers (e.g., data, instructions, parameters, artifacts, etc.), conditions that determine whether a component of a layer (one or more operations in a layer) is to be executed based on conditions of a previous layer, or the like. For example, a workflow layer can be defined to provide data for use in a subsequent layer. Similarly, a workflow layer can be defined to set a condition to be used by a subsequent layer that determines whether one or more of the operations of the subsequent layer are to be executed or bypassed. In such instances, resource requirement determiner 213 can analyze the logic of the workflow to determine what resources are to be used by a particular layer to receive information from a previous layer (e.g., memory, data storage space, processor resources, etc.), or to pass information to a subsequent layer (e.g., memory, data storage space, processor resources, etc.).

For example, if one layer generates data that is to be used by a subsequent layer, resource requirement determiner 213 can factor the resources to be used (e.g., memory, data storage space, etc.) to store the data to be transferred between the layers. Similarly, when analyzing the requirements for the layer that is to receive the data, resource requirement determiner 213 can factor the resources to be used to store the data that is received. In another example, if one layer determines a condition that indicates that one or more components of subsequent layer (e.g., one or more operations of a subsequent layer) are to be bypassed, resource requirement determiner 213 can factor the resources to be used (e.g., memory, data storage space, etc.) to store the condition (or information indicating the condition such as a flag, a register value, parameter, artifact, etc.) to be transferred to the subsequent layer. Similarly, when analyzing the requirements for the layer that is to receive the condition, resource requirement determiner 213 can factor the resources to be used to store the information that is received. Additionally, when analyzing the layer that receives the condition indicating that an operation is to be bypassed, resource requirement determiner 213 can eliminate the resources to be used for that operation from the resource requirement calculation for that layer.

Available resource determiner 214 is responsible for determining whether the set of cloud computing resource requirements associated with the layer (e.g., the set of operations performed by the components of the layer) analyzed by resource requirement determiner 213 is satisfied by available cloud computing resources. In some implementations, available resource determiner 214 can make this determination by assessing the state of the cloud computing environment and determining whether there are unused or unallocated resources sufficient to satisfy the requirements of the layer. If so, workflow analyzer 212 can proceed to the next layer of the workflow and repeat the above process for any subsequent layers of the workflow until the entire workflow has been analyzed. In some implementations, as noted above, upon reaching a determination that available resources do not satisfy the layer being analyzed, workflow analyzer 212 can terminate the workflow analysis without analyzing subsequent layers.

In some implementations, available resource determiner 214 can make the determination in view of other workflows that are executing or scheduled to execute within the cloud computing environment. Available resource determiner 214 can identify an additional workflow executing in the cloud computing environment, determine resource requirements associated with the additional workflow, and make a determination of available resources within the cloud computing environment in view of these additional cloud computing resource requirements. In some implementations, available resource determiner 214 can assess the resources utilized by the executing layer of the additional workflow, then analyze any resource requirements for the next layer of that workflow. If the resources requirements of the subsequent layer exceed those used by the executing layer of that workflow, available resource determiner 214 may subtract the shortfall from the total available resources that may be considered in assessing the workflow received by request receiver 211. In other words, available resource determiner 214 can determine that the additional workflow that is already executing may need to make use of additional resources in the environment, thereby affecting the level of resources available to any workflow that has yet to be executed. Thus, a resource intensive workflow currently executing could prevent another workflow from being scheduled for execution.

In some implementations, available resource determiner 214 may also consider the estimated execution time associated with the additional executing workflow. For example, available resource determiner 214 can determine the estimated execution time for the additional executing workflow and determine the amount of resources available within the cloud computing environment in view of that execution time. In other words, available resource determiner 214 can determine that the resources allocated to the additional workflow may remain allocated for the duration of that workflow's execution time, and therefore, may not be available to any workflow pending approval for execution. Alternatively, available resource determiner 214 may assess the execution time associated fewer than all of the layers of the additional executing workflow. For example, available resource determiner 214 may assess only the executing layer, the executing layer and a single subsequent layer of the executing workflow, etc.

In implementations where the workflow executes within a single cloud computing environment, available resource determiner 214 can assess the available cloud computing resources for that environment. Alternatively, in implementations where the workflow executes across multiple clouds (e.g., a hybrid cloud or multi-cluster cloud computing environment), available resource determiner 214 can assess the available cloud computing resources for the cloud computing environment that is to execute that layer (or one or more operations of that layer).

Once the available resources have been assessed, available resource determiner 214 can return the result to workflow analyzer 212. Workflow analyzer 212 can subsequently determine whether or not to continue processing the workflow. Responsive to determining that the resource requirements of the workflow layer (e.g., the set of operations associated with that layer) are not satisfied by the available cloud computing resources, workflow analyzer 212 can determine that the workflow is not to be executed and reject the request to execute the workflow. As noted above, upon reaching this determination, workflow analyzer 212 can terminate the workflow analysis without analyzing subsequent layers. In some implementations, workflow analyzer 212 can then invoke notification module 215 to send a notification to a client device indicating that the request to execute the workflow has been rejected. The notification can be an alert message sent to a console, a dialog presented to a graphical user interface, a message sent to a mobile device (e.g., a text message, SMS message, etc.), or the like.

As noted above, workflow analyzer 212 can repeat the process by invoking resource requirement determiner 213 and available resource determiner 214 for each layer of the requested workflow until the entire workflow has been analyzed. Responsive to determining that the resource requirements for each of the additional layers (e.g., each of the additional sets of operations associated with the other layers of the workflow) can be satisfied by the available cloud computing resources, workflow analyzer 212 can determine that the workflow is to be executed, and invoke workflow execution module 216 to execute the workflow.

Workflow execution module 216 is responsible for executing the workflow analyzed by workflow analyzer 212. In some implementations, workflow execution module 216 can begin execution of the workflow by provisioning the resources for the first layer of the workflow. For example, workflow execution module 216 can allocate one or more pods that each include at least one container to perform the set of operations associated with the first layer of the workflow. In some implementations, workflow execution module 216 can generate the pods and associated the needed resources with the newly generated pods. Alternatively, workflow execution module 216 can send a request to another system component to generate the pods, where the request includes the resource requirements to be used in generating the pods. In some implementations, when the first layer has completed execution, workflow execution module 216 may be invoked to conduct any resource clean up processing necessary to return the resources to the cloud computing system, and subsequently initiate execution of the subsequent layers of the workflow.

Figure 3:
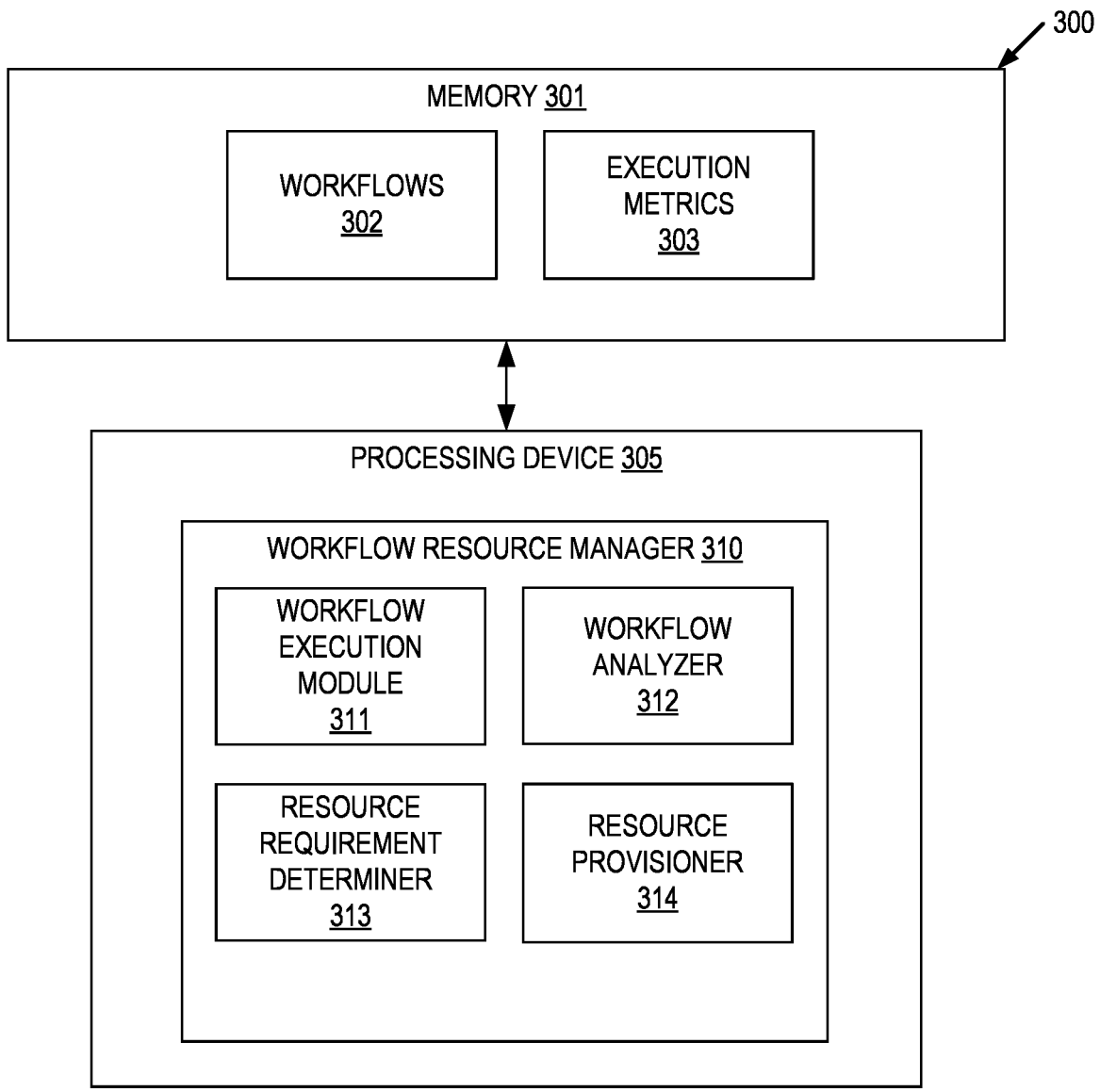
FIG. 3 depicts a block diagram illustrating another example of a workflow resource manager for provisioning resources for executing workflows, in accordance with one or more aspects of the present disclosure.

FIG. 3 depicts a block diagram illustrating an example of a workflow resource manager 310 for provisioning resources for executing workflows in a cloud computing environment. In some implementations, workflow resource manager 310 may correspond to workflow resource manager 142 of FIG. 1. As shown in FIG. 3, workflow resource manager 310 may be a component of a computing apparatus 300 that includes a processing device 305, operatively coupled to a memory 301, to execute workflow resource manager 310. In some implementations, processing device 305 and memory 301 may correspond to processing device 702 and main memory 704 respectively as described below with respect to FIG. 7.

Workflow resource manager 310 may include workflow execution module 310, workflow analyzer 312, resource requirement determiner 313, and resource provisioner 314. Alternatively, the functionality of one or more of workflow execution module 310, workflow analyzer 312, resource requirement determiner 313, and resource provisioner 314 may be combined into a single module or divided into multiple sub-modules.

Workflow execution module 310 is responsible for executing a workflow in a cloud computing environment. As noted above, in some implementations, the cloud computing environment can be a containerized environment, where nodes can include pods, and where each pod can include one or more containers that can be used to execute applications within the environment. Cloud computing environments configured in such a manner can be an OpenShift based environment, a Kubernetes based environment, or the like. In some implementations, the cloud computing environment can be a hybrid cloud or multi-cluster cloud environment made up of multiple clouds of the same or different cloud providers (e.g., one cloud may be an OpenShift cloud, a second cloud could be a Kubernetes cloud, a third cloud could be an Amazon Web Services® (AWS) cloud, etc.).

In some implementations, the workflow may be a machine learning workflow, an artificial intelligence workflow, or other similar type of workflow used to implement resource intensive operations. In an illustrative example, the workflow may be a directed acyclic graph (DAG) that is made up of multiple components or layers, where each layer can include multiple sets of operations. In some implementations, one layer of a DAG can precede one or more additional layers (e.g., one set of operations can precede on or more additional sets of operations). In such instances the completion of a preceding layer can trigger the execution of a subsequent layer. Similarly, a subsequent layer can include data or resource dependencies that rely on the completion of a preceding layer or the data produced by a preceding layer. In various implementations, a layer of a workflow can be executed by one or more pods within the cloud computing environment. An example of a DAG workflow is described below with respect to FIG. 4.

In various implementations, workflow execution module 310 may be invoked in response to a request to execute a layer (e.g., one or more sets of operations associated with a layer) of a workflow (e.g., workflow 202). In an illustrative example, workflow execution module 310 may be invoked to execute a layer of a workflow subsequent to the workflow being analyzed and scheduled for execution as described above with respect to FIG. 2.

Workflow analyzer 312 is responsible for analyzing a layer of a workflow that scheduled for execution, determining the resource requirements of that layer, and provisioning those resources for use with the layer upon execution. When a workflow begins execution, workflow analyzer 312 can determine the cloud computing resource requirements for the layer, and provision them immediately to begin execution of that layer. While that layer is executing, workflow analyzer 312 may be invoked to analyze a subsequent layer of an executing workflow (e.g., the layer that is to be executed when the currently executing layer completes) to determine the cloud computing resource requirements of the subsequent layer and pre-provisioning the resources so that they are reserved for the subsequent layer when that layer is ready for execution. As noted above, the cloud computing resources can include processor (CPU) resources, memory resources, communication port access resources, graphics processor (GPU) resources, tensor processing unit (TPU) resources, disk space, resources associated with persistent volume claims (PVC), or the like.

Workflow analyzer 312 can analyze the workflow layer by layer, starting with the root layer of the workflow. Once a layer begins execution, workflow analyzer 321 can begin analyzing a subsequent layer to pre-provision the resources to satisfy the requirements of the subsequent layer. At each layer, workflow analyzer 312 can invoke resource requirement determiner 313 to determine the resource requirements associated with the layer pending execution, and subsequently invoke resource provisioner 314 to reserve the resources to satisfy the resource requirements for that layer. When the executing layer has completed, workflow execution module 211 can begin execution of the next layer using the pre-provisioned cloud computing resources.

Resource requirement determiner 313 is responsible for determining a set of cloud computing resource requirements associated with a workflow layer (e.g., a set of operations associated with a workflow layer) that is scheduled for execution. As noted above, once a layer of a workflow begins execution, workflow analyzer 312 can invoke resource requirement determiner 313 to determine the set of cloud computing resource requirements associated with the next layer (e.g., the next set of operations associated with that layer) of the workflow. Resource requirement determiner 313 can determine resource requirements for the next layer by analyzing the configuration of that workflow layer, analyzing the logic of the workflow layer (e.g., workflow dependencies, information passed between layers, etc.), or the like. In various implementations, resource requirement determiner 313 can determine resource requirements as described above with respect to resource requirement determiner 213 of FIG. 2.

Resource provisioner 314 is responsible for provisioning at least a portion of cloud computing resources to satisfy the set of cloud computing resource requirements for the workflow layer that is pending execution (e.g., the layer analyzed by resource requirement determiner 313). In various implementations, resource provisioner can identify resources to be provisioned to the next layer of the workflow in view of cloud computing resources currently available in the environment, resources allocated to the currently executing layer of the workflow, resources allocated to other executing workflows, or the like.

In one example, resource provisioner 314 can determine whether the resource requirements associated with the layer pending execution are satisfied by available cloud computing resources. Resource provisioner 314 can determine the available cloud computing resources by assessing the state of the cloud computing environment and determining whether there are unused or unallocated resources sufficient to satisfy the requirements of the layer pending execution. If so, resource provisioner 314 can reserve at least a portion of the available cloud computing resources to be allocated to executing the next layer, where the reserved portion satisfies the resource requirements of that next layer. In some implementations, the resources may be reserved by notifying the cloud computing system that particular resources are to be blocked from being accessed by another process within the system, by writing an entry in a data structure that prevents those resources form being accessed by another process, or in any other similar manner.

In another example, resource provisioner 314 can determine whether the resource requirements associated with the layer pending execution are satisfied by cloud computing resources allocated to the currently executing layer of the same workflow. If so, resource provisioner 314 can reserve at least a portion of the computing resources allocated to the executing workflow layer to be allocated to executing the next layer of the workflow.

In another example, resource provisioner 314 can provision cloud computing resources in view of other executing workflows in the cloud computing system. Resource provisioner 314 can identify an additional executing workflow, where the additional executing workflow is also made up of multiple layers. Resource provisioner 314 can determine the resources allocated to the executing layer of the additional workflow, then determine (or invoke resource requirement determiner 213 to determine) a set of resource requirements associated with the next layer of the additional executing workflow. Resource provisioner 314 can then determine whether any of the resources allocated to the executing layer of the additional workflow are to be allocated to executing the next layer of the additional workflow. If not, then resource provisioner 314 can reserve the unneeded portion of those resources to be allocated to executing the next layer of the workflow (e.g., the workflow currently being analyzed for pre-provisioning).

While specific methods of provisioning have been illustrated above, in various implementations, other methods of provisioning may be used in addition to or as an alternative to the above methods. In other implementations, the above methods may be implemented as a hierarchy where if one method is not able to provision sufficient resources, the other methods may be additionally used to provision any shortfall.

In some implementations, workflow analyzer 312 may also use timing as a factor when provisioning resources. For example, workflow analyzer 312 may wait for a period of time before invoking resource provisioner 314 to execute the provisioning process for a layer pending execution. The waiting period can be configured based on the estimated time the executing layer is expecting to run. By doing so, the provisioning process can be managed in order to reduce the amount of time that available resources can be held in reserve, thereby improving the overall resource utilization of the system. In such instances, workflow analyzer 312 can determine an estimated time duration associated with executing the currently executing layer of the workflow. In some implementations, this time duration may be determined based on stored execution metrics information associated with previous executions of the workflow (e.g., execution metrics data 303). Workflow analyzer 312 can then determine a wait time in view of the difference between the estimated time duration and the time that the executing layer began execution. Workflow analyzer 312 can then set a timer that expires at the end of the wait time. For example, workflow analyzer can start the timer at approximately the same time as the start time as the time the executing layer began execution. Alternatively, the time can be started at some time after the executing layer began execution, but expires at a time sufficient to provide resource provisioner 314 the appropriate time to complete the provisioning process in advance of the executing layer completing.

Subsequently, workflow execution module 311 can monitor the execution of the executing layer to determine whether the executing layer has completed. If so, workflow execution module 311 can release the resources allocated to the executing layer (e.g., terminating the pods and containers allocated to the executing layer) and initiate execution of the next layer of the workflow using the provisioned resources. Workflow resource manager 310 can then repeat the above process for the next layer of the workflow that is pending execution. This process can be repeated for each subsequent layer of the workflow until the entire workflow has been analyzed and subsequently executed.

Figure 4:
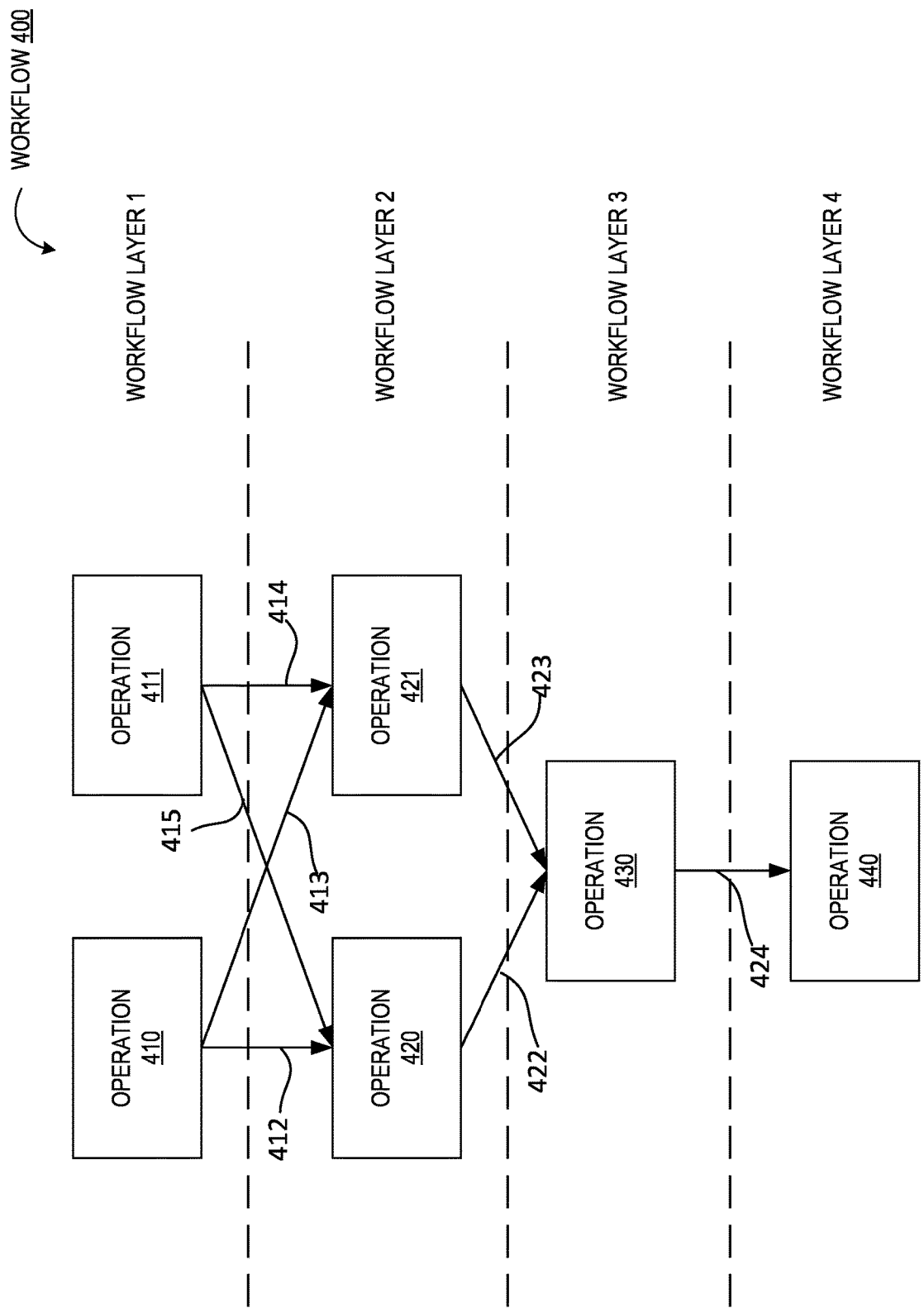
FIG. 4 illustrates an example workflow, in accordance with one or more aspects of the present disclosure.

FIG. 4 illustrates an example of a directed acyclic graph (DAG) workflow 400. As shown in FIG. 4, workflow 400 includes 4 layers, each made up of a set of one or more operations. Operation 440 of workflow layer 4 is preceded by operation 430 of workflow layer 3, the operation of workflow layer 3 is preceded by operations 420 and 421 of workflow layer 2, and the operations of workflow layer 2 are preceded by operations 410 and 411 of workflow layer 1.

As described above with respect to FIG. 2, the workflow resource manager of the present disclosure can analyze workflow layers 1-4 of workflow 400 to determine whether or not workflow 400 can execute. The workflow resource manager can analyze the resource requirements of each layer and determine whether or not the available system resources are sufficient to satisfy the requirements of each layer before permitting execution of workflow 400. For example, the workflow resource manager can begin by analyzing the requirements of workflow layer 1 (e.g., by assessing the individual resource requirements of operations 410 and 411, and combining the requirements to determine the requirements for the workflow layer).

As noted above, the workflow resource manager can analyze the resources needed to execute operations 410 and 411, as well as any dependencies between workflow layer 1 and workflow layer 2 (e.g., dependencies 412, 413, 414, 415). For example, if dependency 412 indicates that data is to be passed between operation 410 and operation 420, the resources to be used to facilitate the data transfer (e.g., memory, data storage space, etc.) can be factored into the resource requirement determination for workflow layer 1 since the data to be transferred may be stored so that it can be received by workflow layer 2. Additionally, when the workflow resource manager analyzes workflow layer 2, this information may also be used to determine the resource requirements for operation 420 of workflow layer 2, since those resources may also be used by operation 420 to receive the transferred data from operation 410.

Similarly, if the workflow logic and/or configuration for dependency 414 indicates that operation 421 is not to be executed by workflow layer 2, the resources to be used to store this information for use by workflow layer 2 (e.g., an indicator, flag, register value, etc.) can be factored into the resource requirement determination for workflow layer 1 since that information may be stored so that it can be received by workflow layer 2. Additionally, when the workflow resource manager analyzes workflow layer 2, this information may also be used to determine the resource requirements for workflow layer 2. For example, since the workflow resource manager can determine, based on the workflow configuration/logic, that operation 421 is not to be executed, it can eliminate any resources associated with operation 421 from the overall resource requirement calculation for workflow layer 2.

If there are sufficient resources available in the system to satisfy the requirements for workflow layer 1, the workflow resource manager proceeds to workflow layer 2 and repeats the process for each of the layers of workflow 400. If at any layer, the workflow resource manager determines that there are insufficient resources to satisfy the requirements of any of the layers, the workflow resource manager rejects the request to execute workflow 400. In some implementations, the workflow resource manager can reject the request without analyzing any subsequent workflow layers. For example, if at workflow layer 2, the workflow resource manager determines there are insufficient resources to satisfy the requirements of workflow layer 2, the workflow resource manager can reject the request to execute workflow 400 without continuing the analysis of the remaining workflow layers (e.g., workflow layer 3 and workflow layer 4).

Additionally, as described above with respect to FIG. 3, workflow resource manager can analyze the subsequent layers of an executing workflow to pre-provision cloud computing resources for the next layer to execute. The workflow resource manager can initiate execution of the operations in workflow layer 1 and, while those operations are executing, analyze the operations in workflow layer 2 to pre-provision cloud computing resources for those layers. As described above, the workflow resource manager can analyze operations 420 and 421 to determine the resource requirements for those operations, then provision the resources to satisfy those requirements.

As noted above, the workflow resource manager can factor any dependencies between workflow layer 1 and workflow layer 2 (e.g., dependencies 412, 413, 414, 415) into the analysis. For example, if dependency 412 indicates that data is to be passed between operation 410 and operation 420, the resources to be used to facilitate the data transfer (e.g., memory, data storage space, etc.) can be factored into the resource requirement determination for workflow layer 2 since the data to be transferred may be stored so that it can be received by workflow layer 2. Thus, those resources can be added to the resources to be pre-provisioned for workflow layer 2.

Similarly, if the workflow logic and/or configuration for dependency 414 indicates that operation 421 is not to be executed by workflow layer 2, the resources to be used to store this information for use by workflow layer 2 (e.g., an indicator, flag, register value, etc.) can be factored into the resource requirement determination for workflow layer 2 since that information may be stored so that it can be received by workflow layer 2. Additionally, the workflow resource manager can determine, based on the workflow configuration/logic, that operation 421 is not to be executed, so it can eliminate any resources associated with executing operation 421 from the overall resource requirement calculation for workflow layer 2. In other words, since operation 421 is not to be executed, the workflow resource manager may not pre-provision those resources.

Subsequently, when the operations of workflow layer 1 complete execution, the workflow resource manager can terminate the pods and containers allocated to the operations of workflow layer 1 and generate the pods and containers to execute the operations in workflow layer 2. The workflow manager, when generating the pods and containers for workflow layer 2, can allocate the pre-provisioned resources to the new pods and execute the operations for layer 2. Subsequently, while the operations in workflow layer 2 are executing, the workflow resource manager can repeat the pre-provisioning process for operation 430 of workflow layer 3, and so on.

It should be noted that while the workflow 400 illustrates a particular number of workflow layers and operations within those workflow layers, in other implementations other workflow configurations may be implemented using the workflow resource manager described above.

Figure 5:
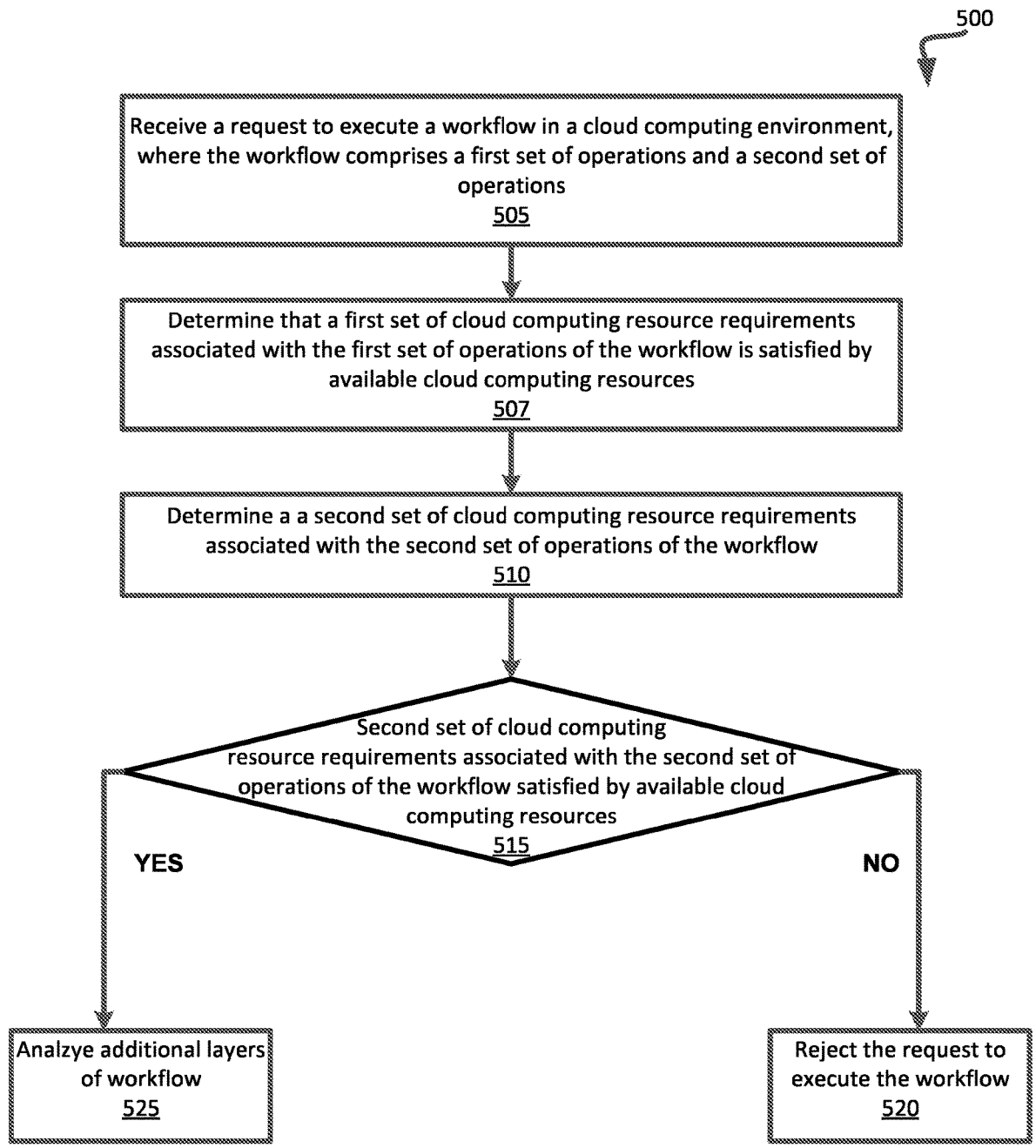
FIG. 5 depicts a flow diagram of a method for facilitating workflow resource management for cloud computing services, in accordance with one or more aspects of the present disclosure.

FIG. 5 depicts a flow diagram of an example method 500 for facilitating workflow resource management for cloud computing services of a cloud computing environment. The method may be performed by processing logic that may comprise hardware (circuitry, dedicated logic, etc.), computer readable instructions (run on a general purpose computer system or a dedicated machine), or a combination of both. In an illustrative example, method 500 may be performed by workflow resource manager 142 in FIG. 1, or workflow resource manager 210 in FIG. 2. Alternatively, some or all of method 500 might be performed by another module or machine. It should be noted that blocks depicted in FIG. 5 could be performed simultaneously or in a different order than that depicted.

At block 505, processing logic receives a request to execute a workflow in a cloud computing environment, where the workflow includes a first set of operations and a second set of operations, and where the first set of operations precedes the second set of operations in the workflow. At block 507, processing logic determines that a first set of cloud computing resource requirements associated with the first set of operations is satisfied by available cloud computing resources of the cloud computing environment. At block 510, processing logic determines a second set of cloud computing resource requirements associated with the second set of operations in the workflow. At block 515, processing logic determines whether the second set of cloud computing resource requirements associated with the second set of operations is satisfied by available cloud computing resources. If not, processing proceeds to block 520. At block 520, processing logic rejects the request to execute the workflow. If at block 525, processing logic determines that the second set of cloud computing resource requirements associated with the second set of operations is satisfied by available cloud computing resources, processing proceeds to block 525. At block 525, processing logic analyzes additional layers in the workflow. In various implementations, the processing logic at block 525 can repeat the process described at blocks 510 and 515 for each additional layer of the workflow until either the entire workflow has been analyzed and permitted to execute, or until a set of operations is encountered in the workflow where the cloud computing resource requirements are not satisfied by the available cloud computing resources, causing the processing logic to proceed to block 520 to reject the request.

Figure 6:
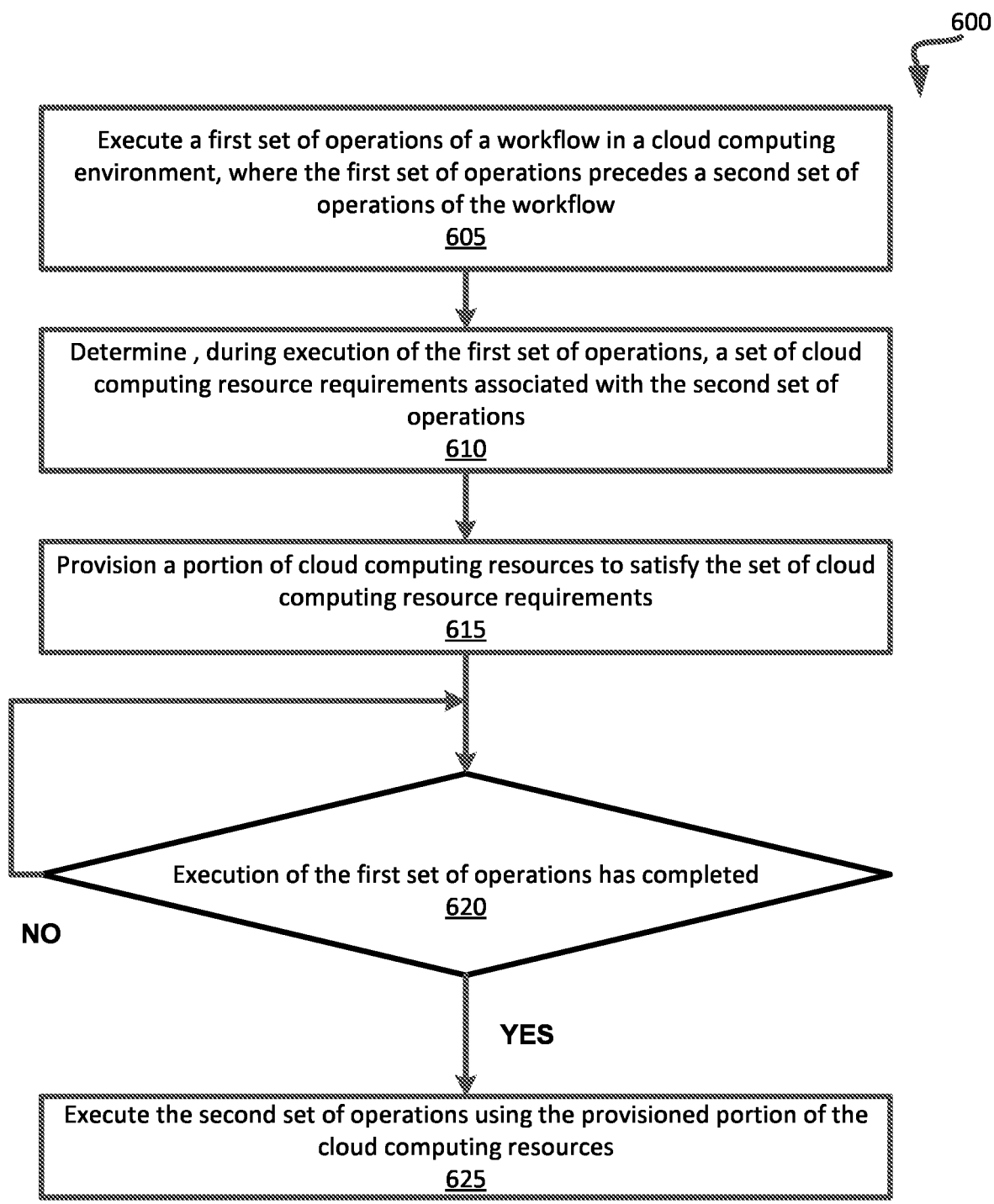
FIG. 6 depicts a flow diagram of a method for facilitating workflow resource provisioning for cloud computing services, in accordance with one or more aspects of the present disclosure.

FIG. 6 depicts a flow diagram of an example method 600 for facilitating workflow resource provisioning for cloud computing services. The method may be performed by processing logic that may comprise hardware (circuitry, dedicated logic, etc.), computer readable instructions (run on a general purpose computer system or a dedicated machine), or a combination of both. In an illustrative example, method 600 may be performed by workflow resource manager 142 in FIG. 1, or workflow resource manager 310 in FIG. 3. Alternatively, some or all of method 600 might be performed by another module or machine. It should be noted that blocks depicted in FIG. 6 could be performed simultaneously or in a different order than that depicted.

At block 605, processing logic executes a first set of operations of a workflow in a cloud computing environment, where the first set of operations precedes a second set of operations of the workflow. At block 610, processing logic determines, during execution of the first set of operations, a set of cloud computing resource requirements associated with the second set of operations. At block 615, processing logic provisions a portion of cloud computing resources to satisfy the set of cloud computing resource requirements. At block 620, processing logic determines whether the execution of the first set of operations has completed. If not, processing logic continues to monitor the execution of the first set of operations has completed. If, at block 620, processing logic determines that the first set of operations has completed, processing proceeds to block 625. At block 625, processing logic executes the second set of operations using the provisioned portion of the cloud computing resources. In various implementations, processing logic can repeat the execution of blocks 605 to 625 for each layer of the workflow until the entire workflow has been executed.

Figure 7:
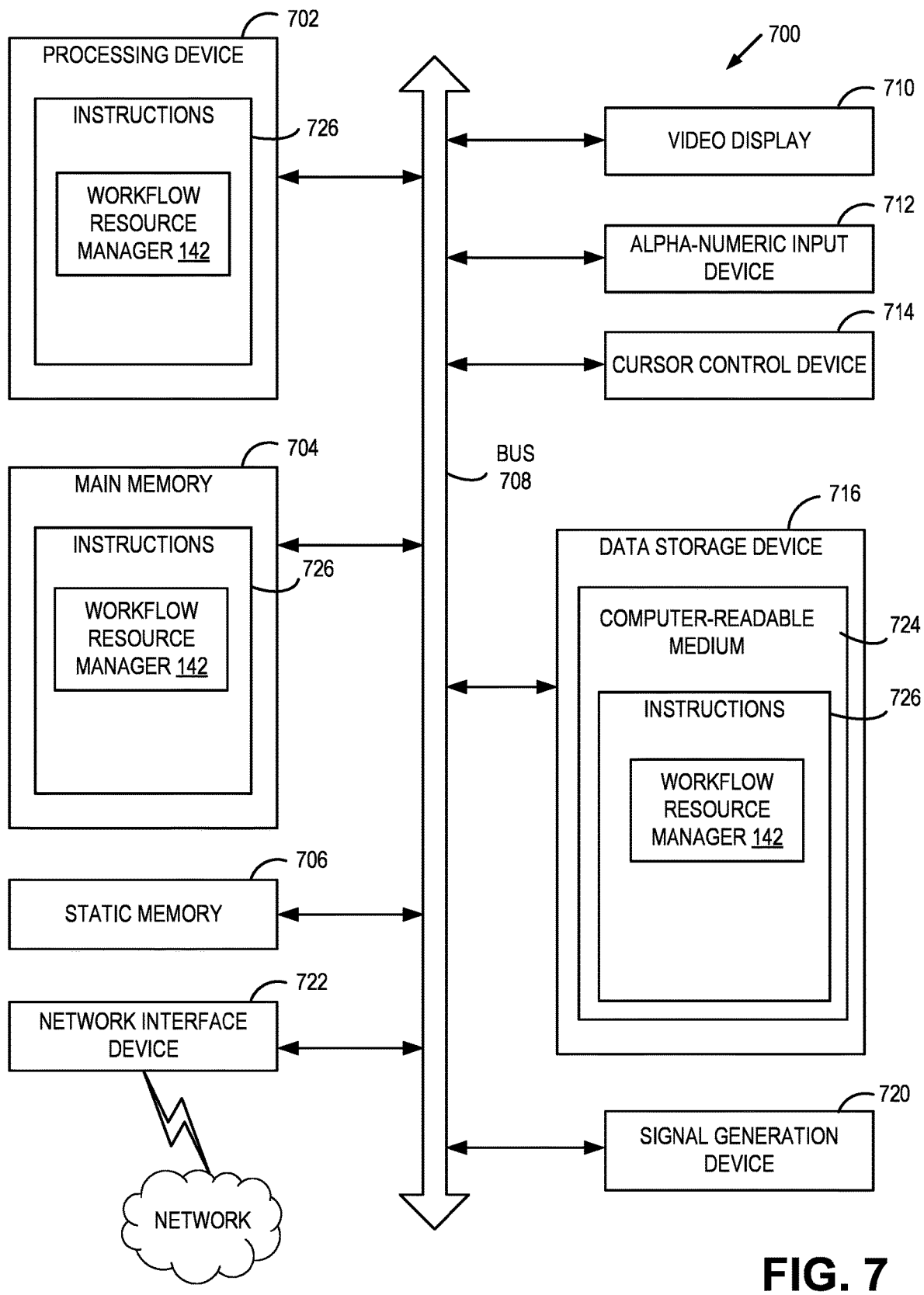
FIG. 7 depicts a block diagram of an illustrative computer system operating in accordance with one or more aspects of the present disclosure.

FIG. 7 depicts an example computer system 700 which can perform any one or more of the methods described herein. In one example, computer system 700 may correspond to computer system 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while a single computer system is illustrated, the term "computer" shall also be taken to include any collection of computers that individually or jointly execute a set (or multiple sets) of instructions to perform any one or more of the methods discussed herein.

The exemplary computer system 700 includes a processing device 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)), and a data storage device 716, which communicate with each other via a bus 708.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. The processing device 702 is configured to execute processing logic (e.g., instructions 726) that includes workflow resource manager 142 for performing the operations and steps discussed herein (e.g., corresponding to the method of FIGS. 5-6, etc.).

The computer system 700 may further include a network interface device 722. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker). In one illustrative example, the video display unit 710, the alphanumeric input device 712, and the cursor control device 714 may be combined into a single component or device (e.g., an LCD touch screen).

The data storage device 716 may include a non-transitory computer-readable medium 724 on which may store instructions 726 that include workflow resource manager 142 (e.g., corresponding to the method of FIGS. 5-6, etc.) embodying any one or more of the methodologies or functions described herein. Workflow resource manager 142 may also reside, completely or at least partially, within the main memory 704 and/or within the processing device 702 during execution thereof by the computer system 700, the main memory 704 and the processing device 702 also constituting computer-readable media. Workflow resource manager 142 may further be transmitted or received over a network via the network interface device 722.

While the computer-readable storage medium 724 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that aspects of the present disclosure may be practiced without these specific details. In some instances, well-known structures and devices are shown in block diagram form, rather than in detail, in order to avoid obscuring the present disclosure.

Unless specifically stated otherwise, as apparent from the following discussion, it is appreciated that throughout the description, discussions utilizing terms such as "receiving," "determining," "executing," "rejecting," "provisioning," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the specific purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Aspects of the disclosure presented herein are not inherently related to any particular computer or other apparatus. Various general purpose systems may be used with programs in accordance with the teachings herein, or it may prove convenient to construct more specialized apparatus to perform the specified method steps. The structure for a variety of these systems will appear as set forth in the description below. In addition, aspects of the present disclosure are not described with reference to any particular programming language. It will be appreciated that a variety of programming languages may be used to implement the teachings of the disclosure as described herein.

Aspects of the present disclosure may be provided as a computer program product that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not have an ordinal meaning according to their numerical designation.

Other computer system designs and configurations may also be suitable to implement the system and methods described herein. The following examples illustrate various implementations in accordance with one or more aspects of the present disclosure.

Example 1 is a method comprising receiving, by a processing device, a request to execute a workflow in a cloud computing environment, wherein the workflow comprises a first set of operations and a second set of operations, and wherein the first set of operations precedes the second set of operations in the workflow; determining that a first set of cloud computing resource requirements associated with the first set of operations is satisfied by available cloud computing resources of the cloud computing environment; determining a second set of cloud computing resource requirements associated with the second set of operations; determining, by the processing device, whether the second set of cloud computing resource requirements associated with the second set of operations is satisfied by the available cloud computing resources; and responsive to determining that the second set of cloud computing resource requirements associated with the second set of operations is not satisfied by the available cloud computing resources, rejecting the request to execute the workflow.

Example 2 is the method of Example 1, wherein the workflow further comprises one or more additional sets of operations, and wherein the second set of operations precedes the one or more additional sets of operations, the method further comprising responsive to determining that the second set of cloud computing resource requirements associated with the second set of operations is satisfied by the available cloud computing resources: determining a corresponding set of cloud computing resource requirements associated with each of the one or more additional sets of operations; and responsive to determining that the corresponding set of cloud computing resource requirements associated with each of the one or more additional sets of operations is satisfied by the available cloud computing resources, executing the workflow.

Example 3 is the method of Example 1, wherein determining the second set of cloud computing resource requirements associated with the second set of operations further comprises determining at least one of a memory resource, a processor resource, a graphics processor resource, a storage space resource, and a bandwidth resource to be used to perform the second set of operations.

Example 4 is the method of Example 1, wherein determining the second set of cloud computing resource requirements associated with the second set of operations further comprises determining one or more dependencies between the second set of operations and a third set of operations, wherein the second set of operations precedes the third set of operations, and wherein the one or more dependencies provide information from the second set of operations to the third set of operations; and determining a third set of cloud computing resource requirements associated with providing the information from the second set of operations to the third set of operations.

Example 5 is the method of Example 1, further comprising identifying an additional workflow executing in the cloud computing environment; determining an additional set of cloud computing resource requirements associated with the additional workflow; and determining the available cloud computing resources in view of the additional set of cloud computing resource requirements.

Example 6 is the method of Example 1, further comprising determining an estimated execution time associated with the additional workflow; and determining the available cloud computing resources further in view of the estimated execution time associated with the additional workflow.

Example 7 is the method of Example 1, wherein the cloud computing environment comprises at least one of an OpenShift cluster or a Kubernetes cluster.

Example 8 is the method of Example 1, wherein the first set of operations is associated with one or more sets of containers.

Example 9 is the method of Example 1, wherein the workflow comprises a directed acyclic graph (DAG).

Example 10 is a system comprising a memory, comprising one or more memory modules, and a processing device, operatively coupled to the memory, to: execute a first set of operations of a workflow in a cloud computing environment, wherein the first set of operations precedes a second set of operations of the workflow; determine, during execution of the first set of operations, a set of cloud computing resource requirements associated with the second set of operations; provision a portion of cloud computing resources to satisfy the set of cloud computing resource requirements; determine whether the execution of the first set of operations has completed; and responsive to determining that the first set of operations has completed, execute the second set of operations using the provisioned portion of the cloud computing resources.

Example 11 is the system of Example 10, wherein to provision the portion of the cloud computing resources, the processing device is further to: determine whether the set of cloud computing resource requirements associated with the second set of operations is satisfied by available cloud computing resources; and responsive to determining that the set of cloud computing resource requirements associated with the second set of operations is satisfied by the available cloud computing resources, reserve a portion of the available cloud computing resources to be allocated to executing the second set of operations, wherein the portion of the available cloud computing resources satisfies the set of cloud computing resource requirements.

Example 12 is the system of Example 10, wherein to provision the portion of the cloud computing resources, the processing device is further to: determine whether the set of cloud computing resource requirements associated with the second set of operations is satisfied by cloud computing resources allocated to executing the first set of operations; and responsive to determining that the set of cloud computing resource requirements associated with the second set of operations is satisfied by the computing resources allocated to executing the first set of operations, reserve the computing resources allocated to executing the first set of operations to be allocated to executing the second set of operations.

Example 13 is the system of Example 10, wherein to provision the portion of the cloud computing resources, the processing device is further to: identify an additional executing workflow in the cloud computing environment, wherein the additional executing workflow comprises an executing set of operations and a subsequent set of operations, wherein the executing set of operations precede the subsequent set of operations; determine an additional set of cloud computing resources allocated to executing the third set of operations; determine an additional set of cloud computing resource requirements associated with the subsequent set of operations; determine whether a portion of the additional set of computing resources allocated to executing the third set of operations are to be allocated to executing the subsequent set of operations; and responsive to determining that a portion of the additional set of computing resources are not to be allocated to executing the subsequent set of operations, reserve the portion of the set of computing resources to be allocated to executing the second set of operations.

Example 14 is the system of Example 10, wherein the first set of operations begins execution at a first time, and wherein to provision the portion of the cloud computing resources, the processing device is further to: determine a first time duration associated with executing the first set of operations and a second time duration associated with provisioning cloud computing resources; determine a wait time in view of a difference between the first time duration and the second time duration; start a timer at approximately the first time, the timer to expire at the end of the wait time; and responsive to detecting the expiration of the timer, initiate the provisioning of the portion of the cloud computing resources.

Example 15 is the system of Example 10, wherein to determine the set of cloud computing resource requirements associated with the second set of operations, the processing device is further to: determine at least one of a memory resource, a processor resource, a graphics processor resource, a storage space resource, and a bandwidth resource to be used to perform the second set of operations.

Example 16 is the system of Example 10, wherein to determine the second set of cloud computing resource requirements associated with the second set of operations, the processing device is further to: determine one or more dependencies between the second set of operations and a third set of operations, wherein the second set of operations precedes the third set of operations, and wherein the one or more dependencies provide information from the second set of operations to the third set of operations; and determine a third set of cloud computing resource requirements associated with providing the information from the second set of operations to the third set of operations.

Example 17 is the system of Example 10, wherein the cloud computing environment comprises at least one of an OpenShift cluster or a Kubernetes cluster.

Example 18 is the system of Example 10, wherein the first set of operations is associated with one or more sets of containers.

Example 19 is the system of Example 10, wherein the workflow comprises a directed acyclic graph (DAG).

Example 20 is a non-transitory computer readable medium comprising instructions, which when accessed by a processing device, cause the processing device to execute a first set of operations of a workflow in a cloud computing environment, wherein the first set of operations precedes a second set of operations of the workflow; determine, during execution of the first set of operations, a set of cloud computing resource requirements associated with the second set of operations; provision, by the processing device, a portion of cloud computing resources to satisfy the set of cloud computing resource requirements; determine an execution status of the first set of operations has completed; and execute the second set of operations in view of the execution status of the first set of operations.

Example 21 is the non-transitory computer readable medium of Example 20, wherein the processing device is further to: determine whether the execution of the first set of operations has completed; and responsive to determining that the first set of operations has completed, execute the second set of operations using the provisioned portion of the cloud computing resources.

Example 22 is the non-transitory computer readable medium of Example 20, wherein to provision the portion of the cloud computing resources, the processing device is further to: determine whether the set of cloud computing resource requirements associated with the second set of operations is satisfied by available cloud computing resources; and responsive to determining that the set of cloud computing resource requirements associated with the second set of operations is satisfied by the available cloud computing resources, reserve a portion of the available cloud computing resources to be allocated to executing the second set of operations, wherein the portion of the available cloud computing resources satisfies the set of cloud computing resource requirements.

Example 23 is the non-transitory computer readable medium of Example 20, wherein to provision the portion of the cloud computing resources, the processing device is further to: determine whether the set of cloud computing resource requirements associated with the second set of operations is satisfied by cloud computing resources allocated to executing the first set of operations; and responsive to determining that the set of cloud computing resource requirements associated with the second set of operations is satisfied by the computing resources allocated to executing the first set of operations, reserve the computing resources allocated to executing the first set of operations to be allocated to executing the second set of operations.

Example 24 is the non-transitory computer readable medium of Example 20, wherein to provision the portion of the cloud computing resources, the processing device is further to: identify an additional executing workflow in the cloud computing environment, wherein the additional executing workflow comprises an executing set of operations and a subsequent set of operations, wherein the executing set of operations precede the subsequent set of operations; determine an additional set of cloud computing resources allocated to executing the third set of operations; determine an additional set of cloud computing resource requirements associated with the subsequent set of operations; determine whether a portion of the additional set of computing resources allocated to executing the third set of operations are to be allocated to executing the subsequent set of operations; and responsive to determining that a portion of the additional set of computing resources are not to be allocated to executing the subsequent set of operations, reserve the portion of the set of computing resources to be allocated to executing the second set of operations.

Example 25 is the non-transitory computer readable medium of Example 20, wherein the first set of operations begins execution at a first time, and wherein to provision the portion of the cloud computing resources, the processing device is further to: determine a first time duration associated with executing the first set of operations and a second time duration associated with provisioning cloud computing resources; determine a wait time in view of a difference between the first time duration and the second time duration; start a timer at approximately the first time, the timer to expire at the end of the wait time; and responsive to detecting the expiration of the timer, initiate the provisioning of the portion of the cloud computing resources.

Example 26 is the non-transitory computer readable medium of Example 20, wherein the cloud computing environment comprises at least one of an OpenShift cluster or a Kubernetes cluster.

Example 27 is the non-transitory computer readable medium of Example 20, wherein the first set of operations is associated with one or more sets of containers.

Example 28 is the non-transitory computer readable medium of Example 20, wherein the workflow comprises a directed acyclic graph (DAG).

Example 29 is a system comprising a memory, comprising one or more memory modules, and a processing device, operatively coupled to the memory, to: receive a request to execute a workflow in a cloud computing environment, wherein the workflow comprises a first set of operations and a second set of operations, and wherein the first set of operations precedes the second set of operations in the workflow; determine a set of cloud computing resource requirements associated with the second set of operations; determine whether the set of cloud computing resource requirements associated with the second set of operations is satisfied by available cloud computing resources; and processing the request to execute the workflow in view of the available cloud computing resources.

Example 30 is the system of Example 29, wherein the processing device is further to: responsive to determining that the set of cloud computing resource requirements associated with the second set of operations is not satisfied by the available cloud computing resources, rejecting the request to execute the workflow.

Example 31 is the system of Example 29, wherein the workflow further comprises one or more additional sets of operations, and wherein the second set of operations precedes the one or more additional sets of operations, wherein the processing device is further to: responsive to determining that the set of cloud computing resource requirements associated with the second set of operations is satisfied by the available cloud computing resources: determine a corresponding set of cloud computing resource requirements associated with each of the one or more additional sets of operations; and responsive to determining that the corresponding set of cloud computing resource requirements associated with each of the one or more additional sets of operations is satisfied by the available cloud computing resources, execute the workflow.

Example 32 is the system of Example 29, wherein determining the second set of cloud computing resource requirements associated with the second set of operations further comprises: determining at least one of a memory resource, a processor resource, a graphics processor resource, a storage space resource, and a bandwidth resource to be used to perform the second set of operations.

Example 33 is the system of Example 29, wherein determining the second set of cloud computing resource requirements associated with the second set of operations further comprises: determining one or more dependencies between the second set of operations and a third set of operations, wherein the second set of operations precedes the third set of operations, and wherein the one or more dependencies provide information from the second set of operations to the third set of operations; determining a third set of cloud computing resource requirements associated with providing the information from the second set of operations to the third set of operations.

Example 34 is the system of Example 29, wherein the processing device is further to: identify an additional workflow executing in the cloud computing environment; determine an additional set of cloud computing resource requirements associated with the additional workflow; and determine the available cloud computing resources in view of the additional set of cloud computing resource requirements.

Example 35 is the system of Example 29, wherein the processing device is further to: determining an estimated execution time associated with the additional workflow; determining the available cloud computing resources further in view of the estimated execution time associated with the additional workflow.

Example 36 is the system of Example 29, wherein the cloud computing environment comprises at least one of an OpenShift cluster or a Kubernetes cluster.

Example 37 is the system of Example 29, wherein the first set of operations is associated with one or more sets of containers.

Example 38 is the system of Example 29, wherein the processing device is further to: send a notification to a client device indicating that the request has been rejected.

Example 39 is the system of Example 29, wherein the workflow comprises a directed acyclic graph (DAG).

Example 40 is an apparatus comprising means for receiving a request to execute a workflow in a cloud computing environment, wherein the workflow comprises a first set of operations and a second set of operations, and wherein the first set of operations precedes the second set of operations in the workflow; means for determining a set of cloud computing resource requirements associated with the second set of operations; means for determining whether the set of cloud computing resource requirements associated with the second set of operations is satisfied by available cloud computing resources; and means for rejecting the request to execute the workflow responsive to determining that the set of cloud computing resource requirements associated with the second set of operations is not satisfied by the available cloud computing resources.

What is claimed is:

1. A method comprising:
receiving, by a processing device, a request to execute a workflow in a cloud computing environment;
determining that a first set of cloud computing resource requirements associated with a first set of operations of the workflow is satisfied by available cloud computing resources of the cloud computing environment;
determining a second set of cloud computing resource requirements associated with a subsequent set of operations; and
responsive to determining that the second set of cloud computing resource requirements associated with the subsequent set of operations of the workflow is not satisfied by the available cloud computing resources, rejecting the request to execute the workflow, wherein the first set of operations precedes the subsequent set of operations in the workflow, wherein the second set of cloud computing resource requirements associated with the subsequent set of operations comprises at least one of a memory resource, a processor resource, a graphics processor resource, a storage space resource, and a bandwidth resource to be used to perform the subsequent set of operations.

2. The method of claim 1, wherein the workflow further comprises one or more additional sets of operations, and wherein the subsequent set of operations precedes the one or more additional sets of operations, the method further comprising:
responsive to determining that the second set of cloud computing resource requirements associated with the subsequent set of operations is satisfied by the available cloud computing resources:
determining a corresponding set of cloud computing resource requirements associated with each of the one or more additional sets of operations; and
responsive to determining that the corresponding set of cloud computing resource requirements associated with each of the one or more additional sets of operations is satisfied by the available cloud computing resources, executing the workflow.

3. The method of claim 1, wherein determining the second set of cloud computing resource requirements associated with the subsequent set of operations further comprises:
determining one or more dependencies between the subsequent set of operations and a third set of operations, wherein the subsequent set of operations precedes the third set of operations, and wherein the one or more dependencies provide information from the subsequent set of operations to the third set of operations; and
determining a third set of cloud computing resource requirements associated with providing the information from the subsequent set of operations to the third set of operations.

4. The method of claim 1, further comprising:
identifying an additional workflow executing in the cloud computing environment;
determining an additional set of cloud computing resource requirements associated with the additional workflow; and
determining the available cloud computing resources in view of the additional set of cloud computing resource requirements.

5. The method of claim 4, further comprising:
determining an estimated execution time associated with the additional workflow; and
determining the available cloud computing resources further in view of the estimated execution time associated with the additional workflow.

6. The method of claim 1, wherein the cloud computing environment comprises at least one of an OpenShift cluster or a Kubernetes cluster.

7. The method of claim 1, wherein the first set of operations of the workflow is associated with one or more sets of containers.

8. The method of claim 1, wherein the workflow comprises a directed acyclic graph (DAG).

9. A system comprising:
a memory; and
a processing device, operatively coupled to the memory, to:
execute a first set of operations of a workflow in a cloud computing environment;
determine, during execution of the first set of operations, a set of cloud computing resource requirements associated with a subsequent set of operations of the workflow, wherein the first set of operations precedes the subsequent set of operations in the workflow;
provision a portion of cloud computing resources to satisfy the set of cloud computing resource requirements; and
responsive to determining that execution of the first set of operations has completed, execute the subsequent set of operations using the provisioned portion of the cloud computing resources.

10. The system of claim 9, wherein to provision the portion of the cloud computing resources, the processing device is further to:
determine whether the set of cloud computing resource requirements associated with the subsequent set of operations is satisfied by available cloud computing resources; and
responsive to determining that the set of cloud computing resource requirements associated with the subsequent set of operations is satisfied by the available cloud computing resources, reserve a portion of the available cloud computing resources to be allocated to executing the subsequent set of operations, wherein the portion of the available cloud computing resources satisfies the set of cloud computing resource requirements.

11. The system of claim 9, wherein to provision the portion of the cloud computing resources, the processing device is further to:
determine whether the set of cloud computing resource requirements associated with the subsequent set of operations is satisfied by cloud computing resources allocated to executing the first set of operations; and
responsive to determining that the set of cloud computing resource requirements associated with the subsequent set of operations is satisfied by the computing resources allocated to executing the first set of operations, reserve the computing resources allocated to executing the first set of operations to be allocated to executing the subsequent set of operations.

12. The system of claim 9, wherein to provision the portion of the cloud computing resources, the processing device is further to:
identify an additional executing workflow in the cloud computing environment, wherein the additional executing workflow comprises an executing set of operations and an additional subsequent set of operations, wherein the executing set of operations precede the additional subsequent set of operations;
determine a first additional set of cloud computing resources allocated to executing the executing set of operations;
determine a second additional set of cloud computing resource requirements associated with the additional subsequent set of operations;
determine whether a portion of the first additional set of computing resources allocated to executing the executing set of operations are to be allocated to executing the subsequent set of operations; and
responsive to determining that the portion of the first additional set of computing resources are not to be allocated to executing the additional subsequent set of operations, reserve the portion of the first additional set of computing resources to be allocated to executing the subsequent set of operations.

13. The system of claim 9, wherein the first set of operations begins execution at a first time, and wherein to provision the portion of the cloud computing resources, the processing device is further to:
determine a first time duration associated with executing the first set of operations and a second time duration associated with provisioning cloud computing resources;
determine a wait time in view of a difference between the first time duration and the second time duration;
start a timer at approximately the first time, the timer to expire at the end of the wait time; and
responsive to detecting the expiration of the timer, initiate the provisioning of the portion of the cloud computing resources.

14. The system of claim 9, wherein to determine the set of cloud computing resource requirements associated with the subsequent set of operations, the processing device is further to:
determine at least one of a memory resource, a processor resource, a graphics processor resource, a storage space resource, and a bandwidth resource to be used to perform the subsequent set of operations.

15. The system of claim 9, wherein to determine the set of cloud computing resource requirements associated with the subsequent set of operations, the processing device is further to:
determine one or more dependencies between the subsequent set of operations and a second subsequent set of operations, wherein the subsequent set of operations precedes the second subsequent set of operations, and wherein the one or more dependencies provide information from the subsequent set of operations to the second subsequent set of operations; and
determine a third set of cloud computing resource requirements associated with providing the information from the subsequent set of operations to the second subsequent set of operations.

16. The system of claim 9, wherein the cloud computing environment comprises at least one of an OpenShift cluster or a Kubernetes cluster.

17. The system of claim 9, wherein the first set of operations is associated with one or more sets of containers.

18. The system of claim 9, wherein the workflow comprises a directed acyclic graph (DAG).

19. A non-transitory computer readable medium comprising instructions, which when accessed by a processing device, cause the processing device to:
execute a first set of operations of a workflow in a cloud computing environment;
determine, during execution of the first set of operations, a set of cloud computing resource requirements associated with a subsequent set of operations of the workflow, wherein the first set of operations precedes the subsequent set of operations in the workflow;
provision, by the processing device, a portion of cloud computing resources to satisfy the set of cloud computing resource requirements; and
execute the subsequent set of operations in view of an execution status of the first set of operations.

* * * * *